(12) United States Patent
Thompson

(10) Patent No.: US 6,658,656 B1
(45) Date of Patent: Dec. 2, 2003

(54) METHOD AND APPARATUS FOR CREATING ALTERNATIVE VERSIONS OF CODE SEGMENTS AND DYNAMICALLY SUBSTITUTING EXECUTION OF THE ALTERNATIVE CODE VERSIONS

(75) Inventor: Carol L. Thompson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 09/702,592

(22) Filed: Oct. 31, 2000

(51) Int. Cl.[7] .............................. G06F 9/45; G06F 9/44
(52) U.S. Cl. ..................... 717/151; 717/140; 717/122
(58) Field of Search ................................ 717/151–161, 717/122, 124–133, 139–146; 714/2, 15–25, 37–38, 34

(56) References Cited

U.S. PATENT DOCUMENTS

| | | | |
|---|---|---|---|
| 5,933,635 A | * | 8/1999 | Holzle et al. ............... 717/151 |
| 5,956,479 A | * | 9/1999 | McInerney et al. ........... 714/38 |
| 5,995,754 A | * | 11/1999 | Holzle et al. ............... 717/158 |
| 6,044,475 A | * | 3/2000 | Chung et al. ................. 714/15 |
| 6,067,641 A | * | 5/2000 | McInerney et al. ........... 714/38 |
| 6,105,148 A | * | 8/2000 | Chung et al. ................. 714/16 |
| 6,240,547 B1 | * | 5/2001 | Holzle et al. ............... 717/141 |

OTHER PUBLICATIONS

Kwak et al. An Optimal Checkpoints Strategy for Real–Time Control Systems Under Transient Faults. IEEE. 2001. pp. 293–301.*

Lawall et al. Efficient Incremental Checkpointing of Java Programs. IEEE. 2000.*

* cited by examiner

*Primary Examiner*—Wei Zhen

(57) ABSTRACT

Method and apparatus for creating alternative versions of code segments and dynamically substituting execution of the alternative code versions. Checkpoints in program code are identified by a compiler, and the checkpoints are used to delineate segments of object code. Two sets of segments of object code are generated, where the first and second sets of object code segments are optimized at different levels. In one embodiment, the first set of segments are optimized at a greater level than the second set of segments. Upon detecting a program error in executing the first set of segments, state information of the program is recovered from a checkpoint, and an object code module is selected from either the first set or second set for execution.

15 Claims, 4 Drawing Sheets

METHOD AND APPARATUS FOR CREATING ALTERNATIVE VERSIONS OF CODE SEGMENTS AND DYNAMICALLY SUBSTITUTING EXECUTION OF THE ALTERNATIVE CODE VERSIONS

FIELD OF THE INVENTION

The present invention generally relates to techniques for recovering from fatal errors encountered in executing computer program code, and more particularly to compilation techniques for addressing the possibility of fatal software errors.

BACKGROUND

Certain types of software errors are fatal to program execution. For example, a reference to a memory address that is beyond the address domain of a program will likely result in a fatal error. Certain timing or other transient conditions may also trigger fatal errors.

While certain errors may be within the control of the software developer, the developer may be unable to guard against certain other errors in developing the software. Though rare, there is a possibility that certain other errors may be introduced in the compilation of the source code. Since the software developer assumes that a compiler will not introduce errors, the developer will have limited opportunity to identify and limited insight into compiler-introduced errors.

Some compilers include an optimization phase for producing code that is fast and small. Code can be optimized in a variety of situations. For example, commonly used sub-expressions may be identified and code generated to evaluate the sub-expression once rather than generating code that repeatedly evaluates the same sub-expression. In another example, a repeated address calculation can be identified and code generated to calculate the address once.

Programming loops are also candidates for optimization. An example optimization of a programming loop is to move loop invariants from within the loop to outside the loop. A loop invariant is a computation that produces the same result in each iteration. By moving a loop invariant to a point in the program just before the loop is entered, the computation is performed once rather than repeatedly in the loop.

While it is a clear objective that any compiler-based code optimization not change the logic of the original source code, it is recognized that complicated optimization techniques have a greater possibility of introducing an error than do straightforward optimization techniques. In addition, optimization may expose program behavior that is potentially erroneous. For example, a program may have variables that are not initialized or asynchronously reference memory locations that have not been properly declared (i.e., volatile in C or C++). These examples may result in code that operates correctly when un-optimized, but fails when optimized.

A method and apparatus that address the aforementioned problems, as well as other related problems, are therefore desirable.

SUMMARY OF THE INVENTION

In various embodiments, methods and apparatus are provided for creating alternative versions of code segments and dynamically substituting execution of the alternative code versions. In one embodiment, a first set of object code segments are generated and optimized at a first optimization level, and a second set of object code segments are generated and optimized at a second optimization level. The second set of object code segments are respectively associated with the first object code segments. In the event that execution of the first set of segments fails, the second set of object code modules are available as alternative code segments to execute.

In another embodiment, checkpoints in the program code are identified by a compiler, and the checkpoints are used to delineate the segments of object code. In one embodiment, the first set of segments are optimized at a greater level than the second set of segments. Upon detecting a program error in executing the first set of segments, state information of the program is recovered from a checkpoint, and an object code module is selected from either the first set or second set for execution.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Compiler-based program optimization is popular because of the drive for ever increasing program performance. At the same time, users demand software reliability. It has been recognized, however that as optimization techniques become more complicated, there may be an accompanying decrease in reliability. From a user's perspective, this is unacceptable. Since the demands for increased performance are unlikely to abate, and it is impracticable to guarantee that compiler optimization of a program will not introduce any errors, recovery from fatal program errors that may be related to program optimization is desirable.

In various embodiments, the present invention provides a method and apparatus for generating alternative code that supports recovery from a fatal program error. In one embodiment, the program code is optimized at different levels, and corresponding object code is generated. If a fatal program error is encountered in executing the program code that is optimized at a first level, then the program state is recovered and alternative program code that is optimized at a second level is executed. In other embodiments, the code may be optimized at more than two levels to provide even more alternatives for program recovery.

Figure 1:
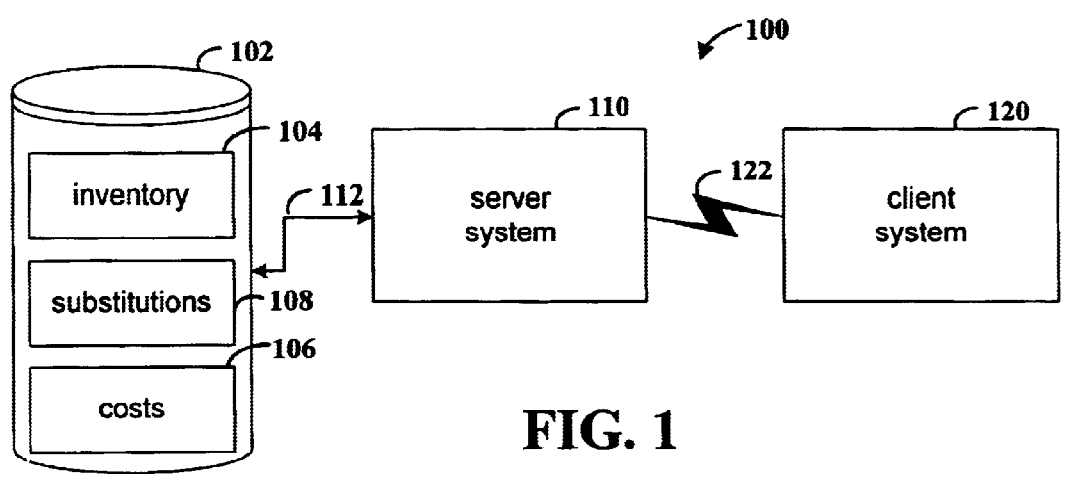
FIG. 1 is a block diagram that illustrates the code that results from compilation of a program in accordance with one embodiment of the invention.

FIG. 1 is a block diagram that illustrates the code that results from compilation of a program in accordance with one embodiment of the invention. One purpose for compiling code in the manner taught herein is to enable recovery from fatal program errors. Block 102 represents program source code that is to be compiled and is comprised of n segments of source code. Checkpoints are used to delineate the multiple segments. A checkpoint is a location in the code at which execution can recommence should the program encounter a fatal error. At each checkpoint, the state of data elements used by the program are stored so that in the event of program failure the state information can be recovered and execution resumed immediately after the checkpoint from which the state was recovered. In various embodiments the checkpoints can be user-programmed or identified by the compiler using recognized techniques.

Compilation of the program source code results in program object code 104 that includes two sets of object segments, object segments 1–n and object segments 1–n'. The object segments in each set correspond to the source segments of program source code 102.

Each set of object segments is code that is generated in compiling the source code with a selected level of optimization. In other words, object segments 1–n are optimized at a first level, and object segments 1'–n' are optimized at a different level. If the program fails during execution of segment i, for example, then the state of the checkpoint data can be recovered from checkpoint that precedes segment i and execution can resume at segment i'.

Figure 2:
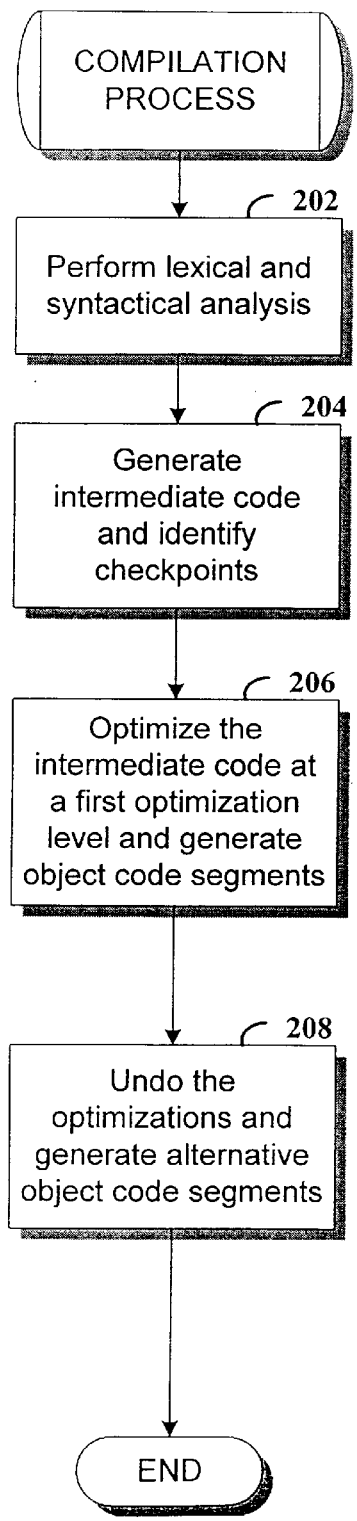
FIG. 2 is a flowchart of a an example process for compiling a program in accordance with one embodiment of the invention.

FIG. 2 is a flowchart of a an example process for compiling a program in is accordance with one embodiment of the invention. The process generally entails optimizing the program code in generating a first set of object code segments and undoing the optimizations of the first set of object code segments in generating a second set of object code segments. The second set of object code segments are available for execution in the event that the a fatal program error is encountered in executing the first set of segments.

At steps 202, 204, and 206, program source code is compiled using known compilation techniques. The flow includes performing lexical and syntactical analysis of the source code and generating intermediate code. The intermediate code is partitioned into segments as described in the co-pending patent application entitled, "Compiler-based Checkpointing for Support of Error Recovery" by Ziegler et al. and filed concurrent herewith, is commonly assigned to the assignee of the present invention, and the contents of which are incorporated herein by reference. From the intermediate code checkpoint code is generated for storing the state of program data at each checkpoint (the end of a segment). At step 206, the intermediate code is optimized and the first set of object code segments are generated.

The level of optimization performed on the intermediate code may be selected according to the desired runtime performance. For example, most compilers will perform either no optimization or only limited optimization by default, but will perform a broad range of optimizing transformations when the user provides an optimization option (e.g. –O for most Unix compilers). On HP-UX compilers from Hewlett-Packard, the user can specify a +On option, where n is a number from 0 to 4 that specifies the level of optimization to apply (0 means no optimization and 4 means the highest level of optimization).

At step 208, an alternative set of object code segments is generated by undoing the optimizations made in generating the first set of segments. For example, common sub-expressions and loop invariants which would have been reused from a previous segment are recomputed. In addition, user-visible variables that were promoted to registers are demoted to memory for the duration of the segment. This requires that that the compiler record the optimizations performed, along with the necessary information to undo them. For example, for common sub-expression elimination, the information could simply be a pointer to the previous computation, or it could be the instruction(s) necessary to re-compute the expression. This information must be stored in order so that the transformations can be undone in reverse of the order in which the transformations were originally applied. This is because the optimizing transformations may be cumulative.

In conjunction with the generation of the optimized and non-optimized code as described above, code is also generated that directs program execution to the optimized code when the program is started. The non-optimized code segments are available for execution if execution of the optimized segments fails.

Figure 3:
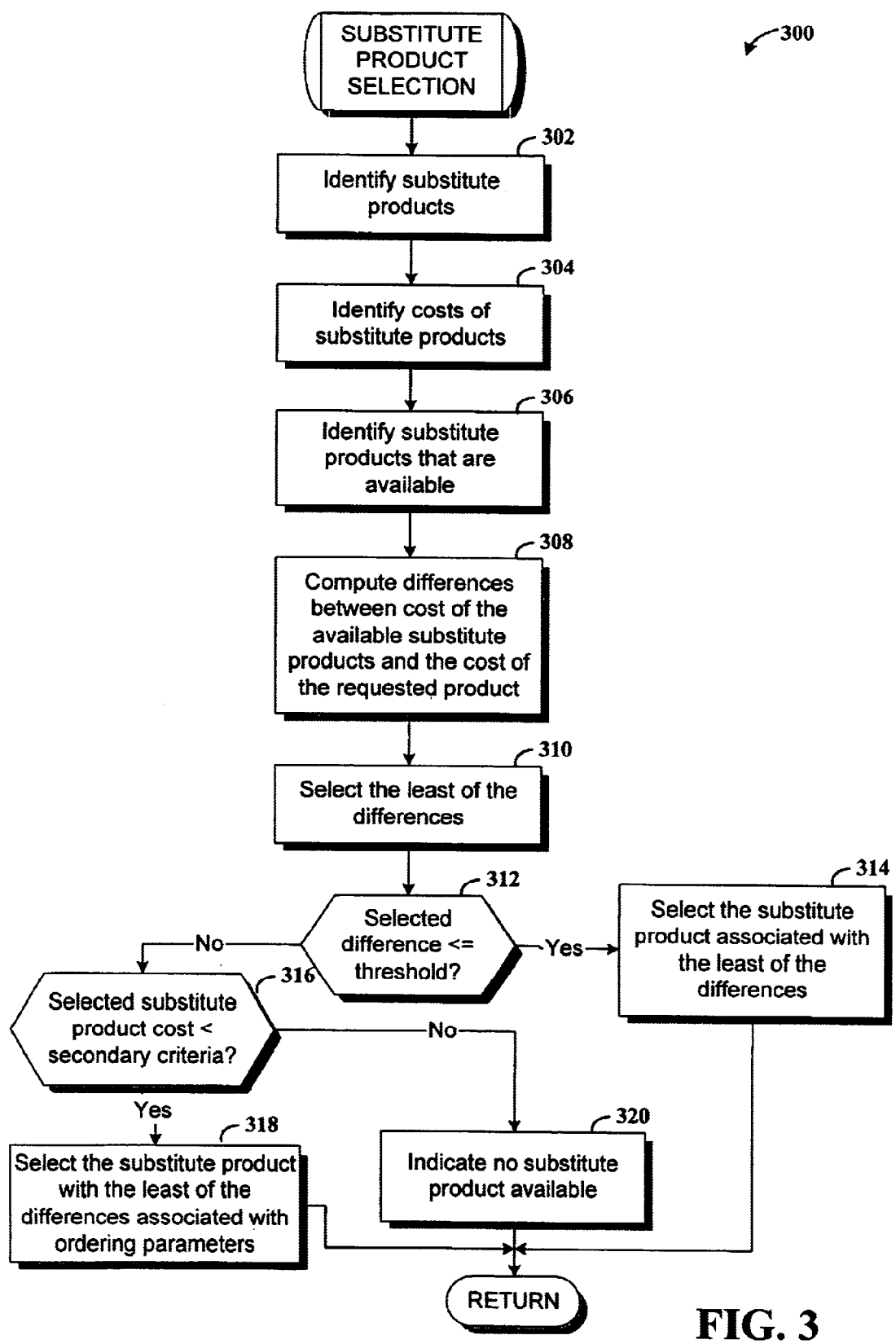
FIG. 3 is a flowchart of an example process for compiling a program in accordance with another embodiment of the invention.

FIG. 3 is a flowchart of an example process for compiling a program in accordance with another embodiment of the invention. The process of FIG. 3 processes the intermediate code on a segment-by-segment basis in generating the optimized and non-optimized code. This eliminates the step of undoing the optimizations, which may introduce errors. Since the code segments are processed individually, an optimized object code segment can be generated from an intermediate segment, and from the same intermediate code segment an alternative object code segment can then be generated without performing any optimization. Optimizing the intermediate code on a segment-by-segment basis, however, eliminates the opportunity to optimize the intermediate code across segment boundaries.

Steps 252 and 254 perform the processing as described above with reference to steps 202 and 204 of FIG. 2. Step 256 obtains the first or next (depending on the iteration of the process loop) segment of intermediate code for processing. At step 258, the selected segment of intermediate code is optimized. It will be appreciated that since the intermediate code is being processed segment-by-segment, no optimization will be performed across segment boundaries.

At step 260, an alternative segment of object code is generated from the selected segment of intermediate code. The alternative segment of object code is generated without optimization. Decision step 262 returns control to step 256 until all the segments of intermediate code have been processed.

Figure 4:
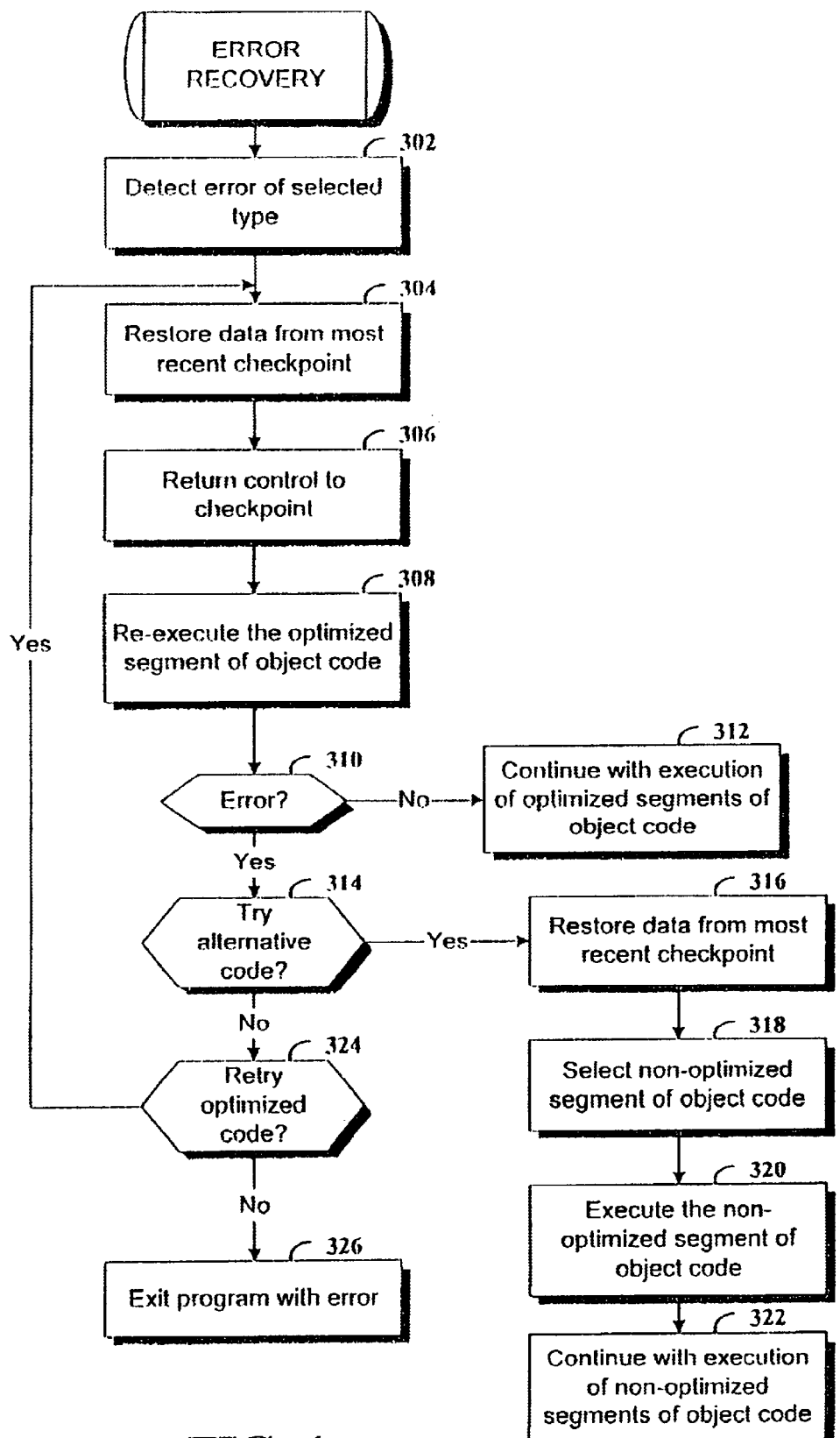
FIG. 4 is a flowchart of an example process for error recovery in accordance with the program compilation techniques of the present invention.

FIG. 4 is a flowchart of an example process for error recovery in accordance with the compiler techniques of the present invention. The process generally entails recovering from a fatal program error by restoring checkpoint data and resuming execution of the program using the non-optimized code segments.

Fatal errors are detected by the operating system, which invokes the appropriate signal handler. In one embodiment, the execution environment for this invention registers signal handlers for those fatal errors which arise due to application program behavior (e.g. out of bounds memory reference, as opposed to a hardware error). These signal handlers identify the code segment being executed, restore the program state from the most recent checkpoint, and either re-invoke the code segment or invoke a non-optimized segment. The identification of the current and alternate code segments is accomplished through mapping tables (not shown) produced by the compiler which map the range of program addresses for the optimized segments to that of the non-optimized segments.

At step 302, the process begins with the detection of a fatal program error. In one embodiment, the point of program execution at which the program failed determines the checkpoint data to be restored. For example at step 304, checkpoint data is restored from the most recent checkpoint. In other embodiments, checkpoint data may be restored from a checkpoint prior to the most recent checkpoint.

Before reverting to execution of the non-optimized code, the program counter is reset to the selected checkpoint at step 306, and the optimized code is re-executed at step 308. Since some errors are transient or timing related, the optimized code may be retried before invoking the alternative code. If the program executes the segment without error, decision step 310 and step 312 illustrate that the program continues with execution of the optimized code.

If an error recurs in executing the optimized segment of code, control is directed to decision step 314, which determines whether the alternative non-optimized code should be tried. In one embodiment, the optimized segment of code may be re-executed a selected number of times before trying execution of the non-optimized code. Control is directed to step 316 when the decision is made to execute the non-optimized code.

At step 316, checkpoint data is restored from the most recent checkpoint, and at step 318, the address of the non-optimized segment of object code is selected for execution. At step 320, the non-optimized segment of object code is executed, and execution of the non-optimized segments of code continues at step 322.

Returning now to decision step 314, if the decision is made to not execute the non-optimized code, control is directed to decision step 324. Decision step 324 tests whether execution of the segment optimized code should be attempted again. If so, control is returned to step 304 to restore the checkpoint data and try again. Otherwise, the program is exited with an error. In one embodiment, the optimized code may be re-executed a selected number of times before aborting.

The present invention is believed to be applicable to compilers for a variety of programming languages. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for compiling program code, comprising:
   generating first object code segments optimized at a first optimization level;
   generating second object code segments optimized at a second optimization level, wherein the second object code segments are respectively associated with the first object code segments;
   identifying checkpoints in the program code during compilation, the checkpoints delineating the object code segments; and
   generating checkpoint code for execution at the checkpoints, wherein the checkpoint code save state information of the program; selecting for execution between a first and second object code segment in response to a program execution error.

2. The method of claim 1, wherein the second optimization level includes no optimizations.

3. The method of claim 2, wherein tile first optimization level includes more optimizations than the second optimization level.

4. The method of claim 1, wherein the first optimization level includes more optimizations than the second optimization level.

5. The method of claim 1, further comprising undoing optimizations made in generating the first object code segments in generating the second object code segments.

6. The method of claim 1, further comprising:
   generating segments of intermediate code;
   for each segment of intermediate code,
      optimizing the segment of intermediate code in generating a corresponding one of the first object code segments; and
      undoing optimizations of intermediate code in generating a corresponding one of the second object code segments.

7. A computer-implemented method for recovery from a program execution error, comprising:
   identifying checkpoints in a program code during compilation;
   generating checkpoint code for execution at the checkpoints, wherein the checkpoint code saves state information of the program;
   generating first object code segments optimized at a first optimization level, the object code segments delineated by the checkpoints;
   generating second object code segments optimized at a second optimization level, wherein the second object code segments are respectively associated with the first object code segments;
   upon detecting a program error, recovering state information of the program from a checkpoint; and
   selecting for execution between a first and second object code segment associated with the checkpoint of the recovering step.

8. The method of claim 7, wherein the first optimization level includes more optimizations than the second optimization level, and further comprising:
   initially executing the first object code segments; and
   retrying execution of a first object code segment associated with the checkpoint from the recovering step before selecting a second object code segment for execution.

9. The method of claim 7, wherein the second optimization level includes no optimizations.

10. The method of claim 9, wherein the first optimization level includes more optimizations than the second optimization level.

11. The method of claim 7, wherein the first optimization level includes more optimizations than the second optimization level.

12. The method of claim 7, further comprising undoing optimizations made in generating the first object code segments.

13. An apparatus for compiling program code, comprising:
   means for generating first object code segments optimized at a first optimization level;
   means for generating second object code segments optimized at a second optimization level, wherein the second object code segments arc respectively associated with the first object code segments;
   means for identifying checkpoints in a program code during compilation, the checkpoints delincating the object code segments; and
   means for generating checkpoint code for execution at the checkpoints, wherein the checkpoint code save state information of the program; means for selecting for execution between a first and second object code segment in response to a program execution error.

14. An apparatus for recovery from a program execution error, comprising:

means for identifying checkpoints in a program code during compilation;

means for generating checkpoint code for execution at the checkpoints, wherein the checkpoint code saves state information of the program;

means for generating first object code segments optimized at a first optimization level, the object code segments delineated by the checkpoints;

means for generating second object code segments optimized at a second optimization level, wherein the second object code segments are respectively associated with the first object code segments;

means for upon detecting a program error, recovering state information of the program from a checkpoint; and means for selecting for execution between a first and second object code segment associated with the checkpoint of the recovering step.

15. A computer program product configured for causing a computer to perform the steps of:

generating first object code segments optimized at a first optimization level;

generating second object code segments optimized at a second optimization level, wherein the second object code segments are respectively associated with the first object code segments;

identifying checkpoints in a program code during compilation, the checkpoints delineating the object code segments; and generating checkpoint code for execution at the checkpoints, wherein the checkpoint code save state information of the program; selecting for execution between a first and second object code segment in response to a program execution error.

* * * * *

UNITED STATES PATENT AND TRADEMARK OFFICE
CERTIFICATE OF CORRECTION

PATENT NO.    : 6,658,656 B1
DATED         : December 2, 2003
INVENTOR(S)   : Carol L. Thompson It is certified that error appears in the above-identified patent and that said Letters Patent is hereby corrected as shown below:

<u>Column 5,</u>
Line 65, delete "tile" and insert therefor -- the --

<u>Column 6,</u>
Line 61, delete "arc" and insert therefor -- are --
Line 64, delete "delincating" and insert therefor -- delineating --

Signed and Sealed this

Eighth Day of February, 2005

JON W. DUDAS
*Director of the United States Patent and Trademark Office*